US007735654B2

(12) United States Patent
Malmberg

(10) Patent No.: US 7,735,654 B2
(45) Date of Patent: Jun. 15, 2010

(54) SCREENING ARRANGEMENT

(75) Inventor: Mats Malmberg, Rydsgård (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/606,385

(22) Filed: Nov. 30, 2006

(65) Prior Publication Data

US 2007/0138066 A1 Jun. 21, 2007

(30) Foreign Application Priority Data

Dec. 14, 2005 (SE) .................................... 0502745

(51) Int. Cl.
*B07B 1/28* (2006.01)
*B07B 1/04* (2006.01)
*A01D 46/02* (2006.01)

(52) U.S. Cl. ........................ 209/263; 209/264; 209/267

(58) Field of Classification Search ................. 209/261, 209/263, 264, 266, 267, 931
See application file for complete search history.

(56) References Cited

U.S. PATENT DOCUMENTS 865,185 A * 9/1907 Kerrigan ..................... 209/397
1,142,434 A * 6/1915 James ......................... 209/397
1,505,735 A * 8/1924 Stebbins ...................... 209/467
1,561,632 A * 11/1925 Woodward .................. 209/397
3,232,431 A 2/1966 Musschoot et al.
3,513,973 A * 5/1970 Grulke ....................... 414/291
4,465,592 A 8/1984 Nagl
5,211,291 A * 5/1993 Kelley et al. ................ 209/680
5,417,858 A 5/1995 Derrick et al.
6,484,885 B1 11/2002 Lilie et al.
6,755,307 B1 6/2004 Köhl

FOREIGN PATENT DOCUMENTS

| | | |
|---|---|---|
| DE | 33 19 032 | 11/1984 |
| SU | 1279683 | 12/1986 |
| WO | 2005/077551 | 8/2005 |

* cited by examiner

*Primary Examiner*—Patrick Mackey
*Assistant Examiner*—Mark Hageman
(74) *Attorney, Agent, or Firm*—Drinker Biddle & Reath LLP

(57) ABSTRACT

A screening arrangement in a vibrating screen for screening of material, such as crushed stone, gravel or the like, the screening arrangement having directing means provided on top of the screening arrangement to direct the material to be screened, such that the directing means are arranged to direct or adjust the width of screening material in relation to the amount of material to be screened, and to achieve a continuous optimal layer of the material to be screened.

12 Claims, 8 Drawing Sheets

SCREENING ARRANGEMENT

This application claims priority under 35 U.S.C. §119 to Sweden Patent Application No. 0502745-3, filed on Dec. 14, 2005, the disclosure of which is incorporated by reference herein in its entirety.

FIELD OF THE INVENTION

The present invention relates generally to a screening arrangement in a vibrating screen for screening of material, such as crushed stone, gravel or the like, the screening arrangement being a screening media provided with directing means to direct the material to be screened.

BACKGROUND OF THE INVENTION

In mining and stone industries, it is in many cases important to fractionate crushed stone and gravel into fractions of stones with different sizes. In most cases, fractionating or screening is done by supplying an unfractionated stream of crushed stone or gravel to a vibrating screen provided with a screening deck including screening holes for allowing stones smaller than the screening holes to pass through the holes.

To achieve a good fractionating or screening result, the stream or layer of crushed stone or gravel should neither be too thick nor too thin. If the stream is too thick, material that should pass through the screening holes tends, in larger amount, to leave the screening deck without being screened, as the material tends to travel on top of the screening deck. If the stream is too thin, the material tends to bounce on the screening deck and likewise not pass through the screening holes.

In the prior art, attempts have been made to overcome the above drawbacks. One solution has been to arrange raisings on the screening deck that extend across the traveling direction of the stream and that covers a part of the width of the screen. These raisings slow down the stream and decrease the bouncing of the material.

Another related prior art is disclosed by U.S. Pat. No. 6,484,885, which discloses a screen with raised ribs, the raised ribs being diagonally arranged relative to the traveling direction of the material. The screen is used in drilling wells to screen solid particles from clay, where the raised ribs prevent the mud from migrating and spreading over the screen, but instead concentrate and gather the solids and make them pass through the screen. U.S. Pat. No. 4,465,592 discloses another screen having diagonally arranged raised ribs for the purpose of concentrating the material on the screening surface.

An object of the invention is to provide a screening arrangement that improves the flow of material on the screening arrangement so that an improved screening result is achieved.

Another object of the invention is to provide a screening arrangement that is flexible in relation to the mixes of material to be screened and still provide an efficient screening.

Yet another object of the invention is to enable efficient screening if the feeding of material to the screening arrangement is reduced or disturb in any way.

SUMMARY OF THE INVENTION

In an embodiment, the invention provides a screening arrangement in a vibrating screen for screening of stone or gravel material. The screening arrangement includes directing means provided on top of the screening arrangement to direct the material to be screened, such that the directing means are arranged to direct or adjust the width of screening material in relation to the amount of material to be screened, and to achieve a continuous optimal layer of the material to be screened.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
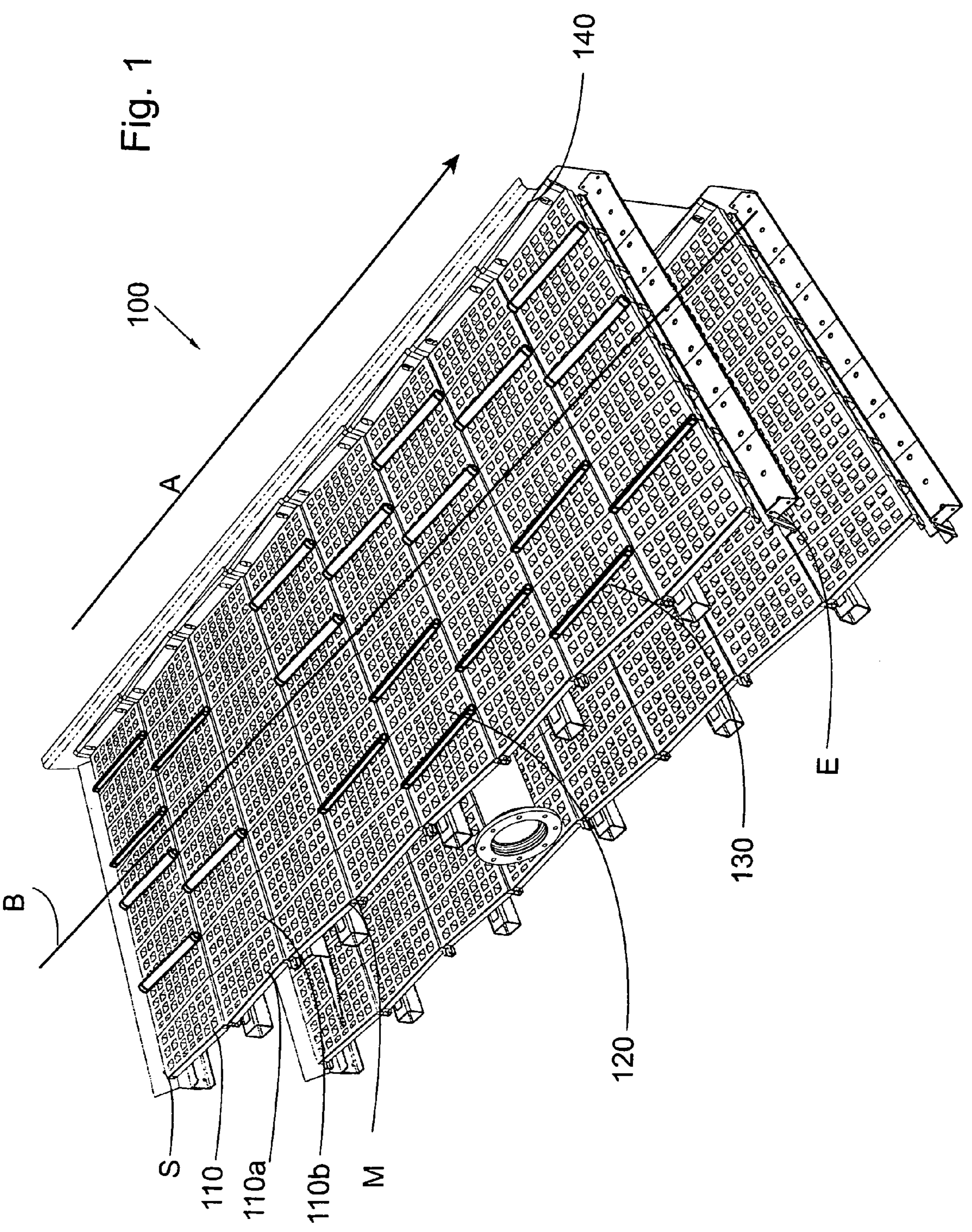
FIG. 1 is a schematic perspective assembly view of a screening arrangement provided with directing means according to the invention.

FIG. 1 schematically shows a screening arrangement 100 for a vibrating screen for screening of crushed stones, gravel or the like. A longitudinal direction of the vibrating screen is indicated with an arrow A in FIG. 1. The longitudinal direction A of the screening arrangement 100 is also the main traveling direction of the material, e.g. stones or gravel, on the vibrating screen.

Each screening deck 120 includes a number of rows of screening elements 110. In each row, alternately orientated screening elements 110*a* and 110*b* are arranged. The screening elements 110*a* and 110*b* have a substantially identical shape, but the screening element 110*a* is arranged with its narrow end down along the traveling direction A of the screened material and the wide end up towards the traveling direction A of the screened material, and the screening element 110*b* is orientated in reverse. The screening elements 110*a* and 110*b* are normally alternately placed so that the neighboring screen element 110 always will be orientated in the opposite direction and so that they together form a screening deck 120. These kinds of screening elements 110*a* and 110*b* are previously shown in international application publication no. WO2005077551.

In the shown embodiment, screening elements 110 are used, but it could also be a cross-tensioned screening media or a longitudinally tensioned screening media that is arranged in a vibrating screen by means of fastening arrangements in each end of the screening media that fasten the screening media to the walls or the ends of the vibrating screen, respectively. Such an alternative screening arrangement will later be described in connection with FIGS. 3 and 4. Yet another alternative screening arrangement can be a self-carrying screening arrangement, e.g. a modular system where each module includes a flexible screening cloth surrounded by a metal frame.

Both the screening media and the screening elements 110 constitute a screening surface, whereby the screening surface is provided with through holes for fractionating crushed stone and gravel into fractions of stones with different sizes. The screening elements 110 may also include a frame, whereupon the screening surface is arranged.

On the screening deck 120 or screening surface, directing means 130 are arranged in the shape of bars, barriers, beams or other types of raised portions. The raised portions 130 may be arranged along the side edge 111 (see FIG. 7*b*) of selectively chosen screening elements (see FIGS. 1 and 2), having substantially the same length as the side edge of the screening elements 110. Since the directing means or the raised portions 130 are arranged along the side edge 111 of a screening element 110, the longitudinal extensions of raised portions 130 are slightly inclined relative to the traveling direction A of the screened material and relative to the longitudinal direction A of the vibrating screen due to the shape of the screening element 110.

The raised portions 130 may have a substantially triangular cross-section, i.e. that of a right angle triangle, where the two sides are straight lines and the hypotenuse is a slightly curved line outwards. Another profile of the cross-section may be, e.g. a true triangular cross-section, with the same or a different length of the sides, or a right angle triangle having a hypotenuse, which is curved inwards. Alternative configurations of the raised portions 130 will be described in connection with FIGS. 6*a*-6*g*.

Figure 7B:
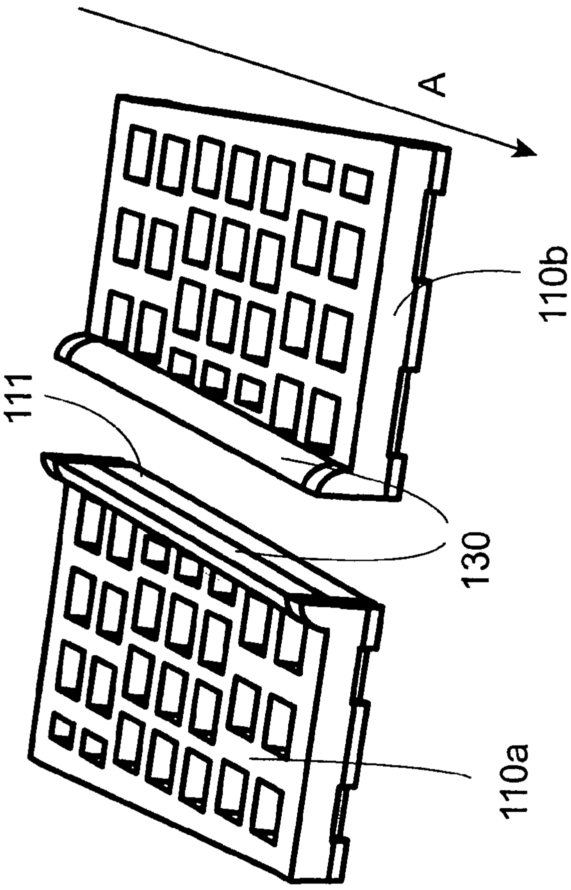
FIGS. 7*a-b* are schematic perspective views of screening elements provided with directing means according to the invention.
Figure 7A:
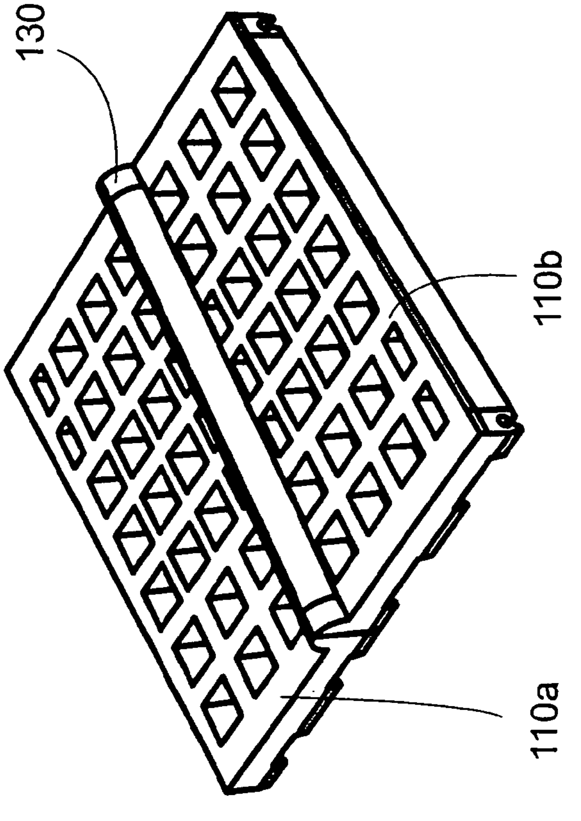
Figures 8A, 8B, 8C:
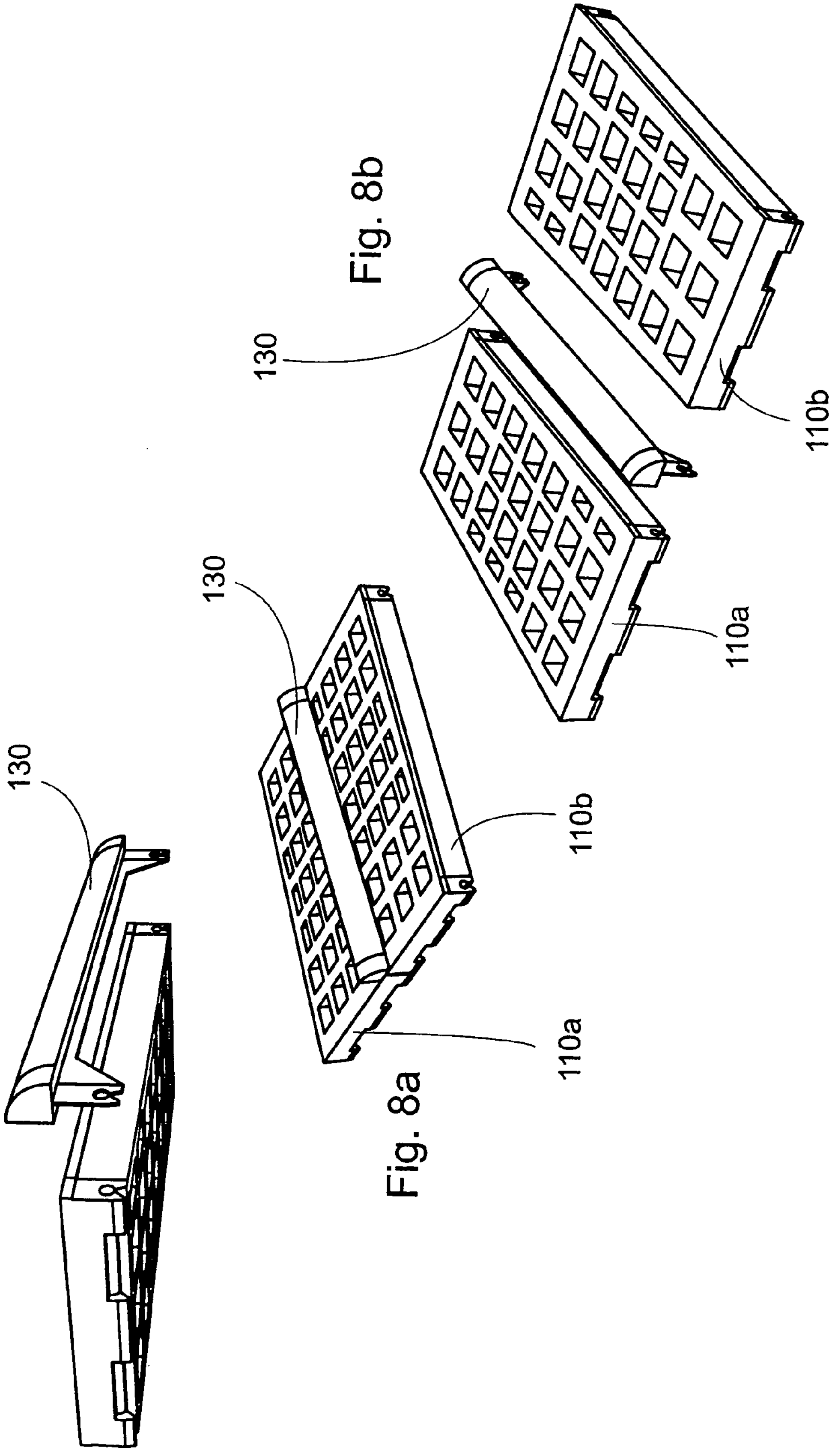
FIGS. 8*a-c* are schematic perspective views of screening elements provided with separate directing means according to the invention.

The raised portions 130 can either be formed as separate parts, detachably attached to the screening elements 110, or as an integrated part of the screening elements 110 (see FIGS. 7*a* and 7*b*). If the raised portion 130 is formed as a separate part (see FIGS. 8*a*-8*c*), mounted on the screening element 110, the raised portion 130 can be attached to the screening element 110 by vulcanization, screwing, jamming, snap-on (see FIGS. 8*b* and 8*c*), bolting, gluing or any other suitable fastening method. The raised portion 130 can, if it is a separate part, either be attached to the end portions of the screening element 110 or be arranged and attached between in a space between two adjacent screening elements 110. If the raised portion 130 is an integrated part of the screening element 110, the raised portion 130 will typically be attached along its entire length to the screening element 110.

Figure 2:
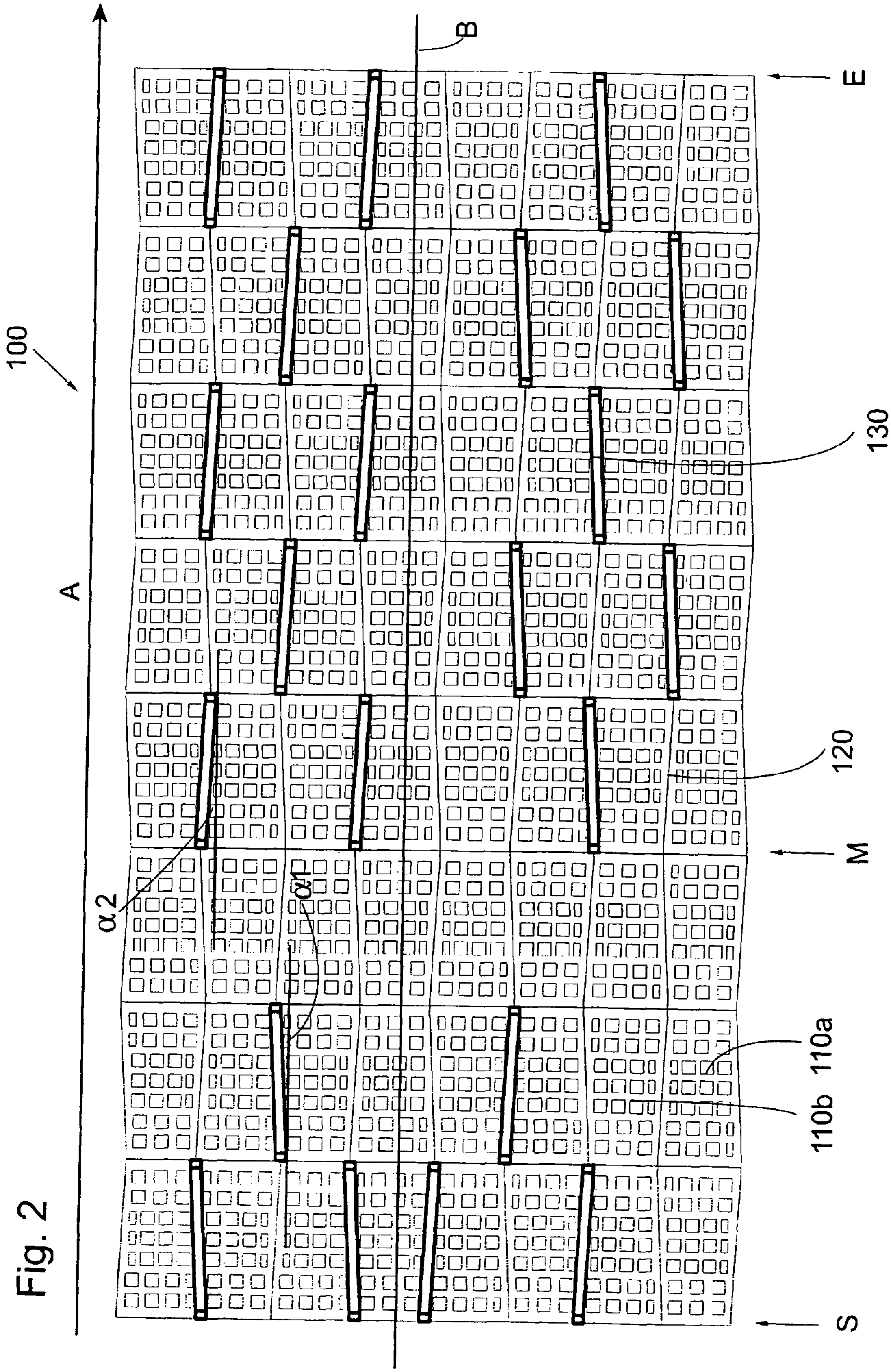
FIG. 2 is a plane view of a screening deck provided with directing means according to the invention.
Figure 3:
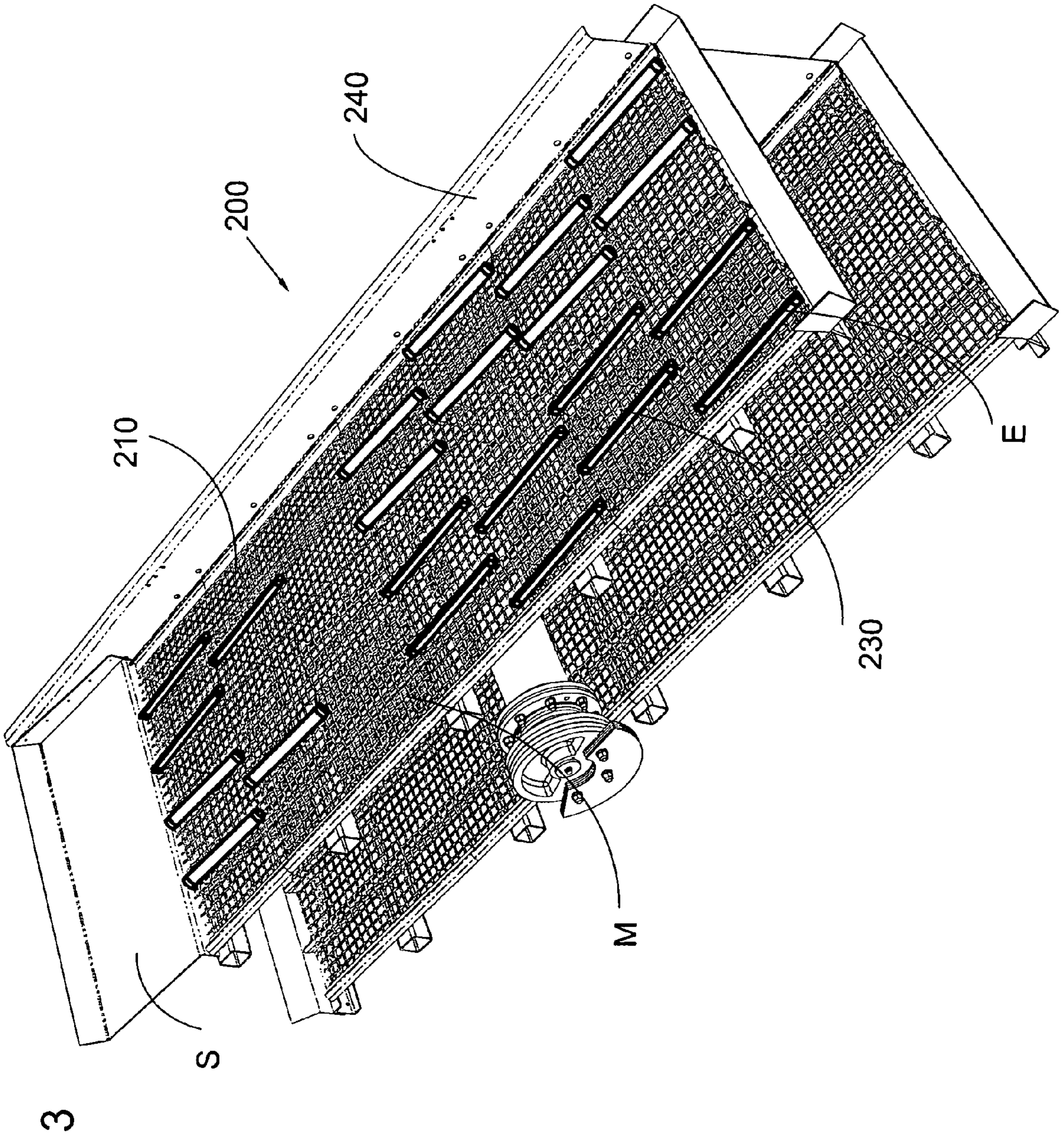
FIG. 3 is a perspective view of an alternative screening arrangement provided with directing means according to the invention.
Figure 4:
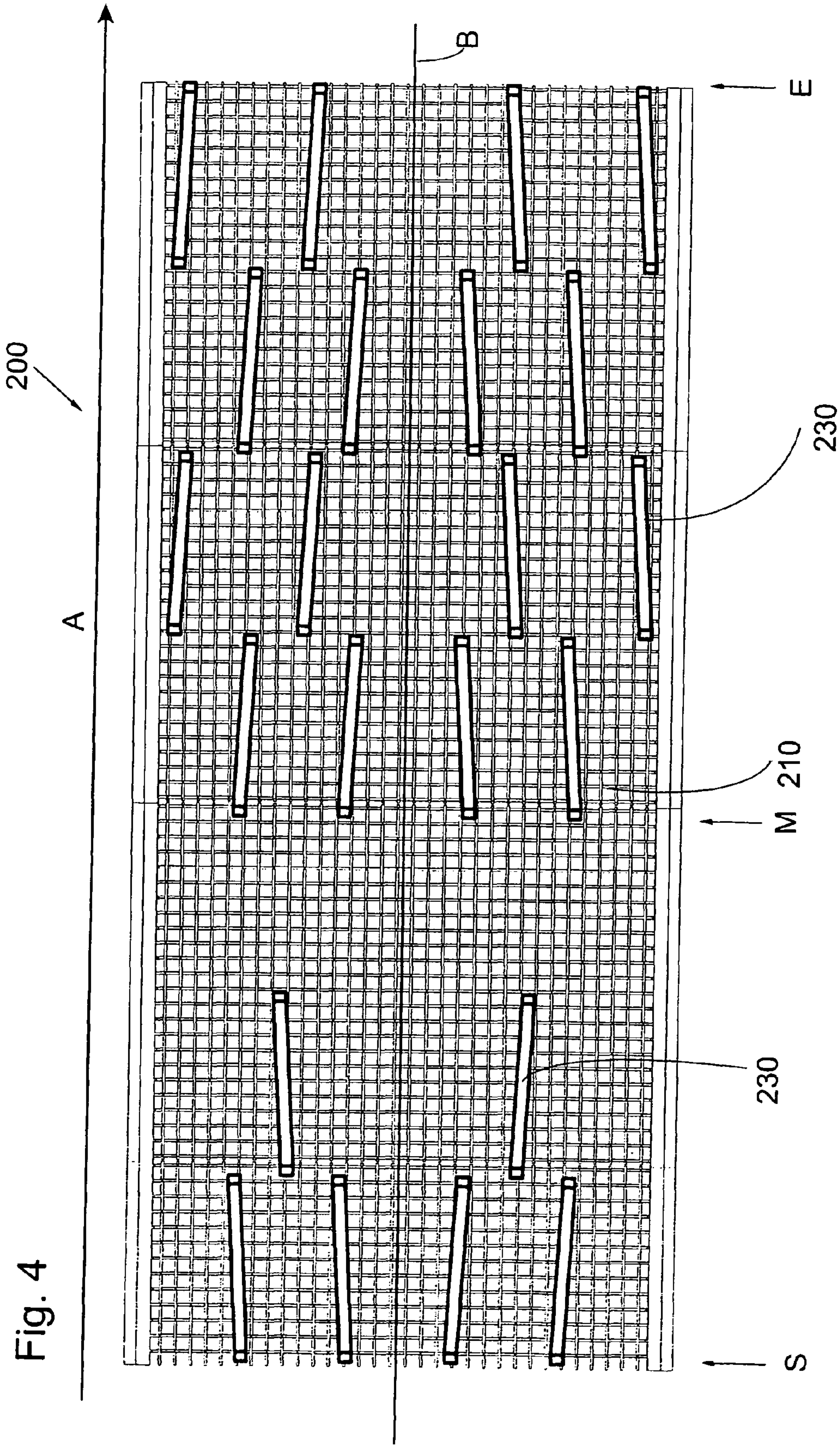
FIG. 4 is a plane view of the alternative screening arrangement provided with directing means of FIG. 3.

In FIGS. 3 and 4, directing means 230 are arranged on the surface of a cross-tensioned or a longitudinally tensioned screening media 210 in a screening arrangement 200. The directing means 230 may have any suitable length, but preferably the length corresponds to that of a screening element 110. In this case, the raised portions 230 are formed and can be attached with any of the fastening methods discussed in relation to the raised portions 130 as formed as a separate part of FIGS. 1 and 2, detachably attached to the screening element 110.

Both the screening media or surface 210, and the raised portions 230, can be made of the same material, but in a preferred embodiment, the raised portions 230 are manufactured of relatively unresilient PU, whereas the screening surface 210 is manufactured of a more resilient PU.

Preferred materials for the raised portions 130 are, e.g. steel, ceramics, polymer materials such as PU, rubber, PVC, polyethylene, polyamide, polyester, urethane rubber, suitable natural rubber compounds, other rubber materials, or the like.

As shown in FIG. 1, the raised portions 130 are arranged differently along longitudinal direction A of the screening deck or surface 120. The below discussed orientation of the raised portions 130 is seen from a middle center line B of the screening deck 120 (see FIG. 2). At the upper end S of the screening deck 120, the raised portions 130 are arranged on each side of the center line B having the curved hypotenuse or surface directed towards the side walls 140 of the screening deck and being arranged on screening elements 110*a* having their narrower end arranged upstream. An angle $\alpha 1$ is created between the longitudinal direction A of the screening arrangement 100 and the longitudinal direction of the raised portion 130 showing that the longitudinal direction of the raised portions in the upper part of the screening deck 120 point towards the side walls of the screening arrangement 100.

Further down the screening deck 120, from point M to point E, the raised portions 130 are arranged on each side of the center line B having the curved hypotenuse or surface directed towards the middle of the screening deck 120 and arranged on screening elements 110*b* having their wider end arranged upstream. Here an angle $\alpha 2$ is created between the longitudinal direction A of the screening arrangement 100 and the longitudinal direction of the raised portion 130 showing that the longitudinal direction of the raised portions in the upper part of the screening deck 120 point towards the center of the screening arrangement 100.

As shown in FIGS. 1 and 2, two or more raised portions 130 are arranged on each row of screening elements 110, but there can also be rows of screening elements 110 where no raised portions 130 are arranged. In case a tensioned screening media 210 is used, the raised portions 230 are arranged in the same manner as in the case of the raised portions 130 that are arranged on the screening elements 110, but the raised portions 230 are arranged in virtual spaced rows, perpendicular to the longitudinal direction A of the screening arrangement 200, since the screening media or surface 210 is one surface without any physical rows, as on the screening deck 120.

The function of the screening arrangement 100 and 200 is as follows: material to be screened enters the screening deck 120 or screening media 210 at point S, the raised portions 130, 230 serve to distribute the material towards the walls of the screening arrangement 100 and 200, since the raised portions 130, 230 are arranged inclined towards the side walls 140, 240 of the screening arrangement 100, 200 and thereby direct the material more towards the side walls of the screening arrangement 100, 200. This accomplishes a material bed or layer of the material to be screened as even as possible to enhance the screening of the material. If the layer of material is too thick, material that should pass through the screening holes tends in larger amount to leave the screen without being screened, as the material tends to continue to travel on top of the screening deck 120 or screening media 210. As the material continues to travel along the traveling direction A, material is screened and the material layer gets thinner and thinner. To prevent the material from bouncing on the screening deck 120 or the screening media 210 and not being screened as a result of a too thin material layer, the raised portions 130, 230, from point M and further down the screening arrangement 100, 200, are arranged to concentrate or gather the material towards the center of the screening deck 120 or the screening media 210. Here the raised portions 130, 230 are inclined towards the middle (center line B) of the screening deck 120, screening media 210, and serve to direct the material to the center of the screening deck, to accomplish this.

Figure 5A:
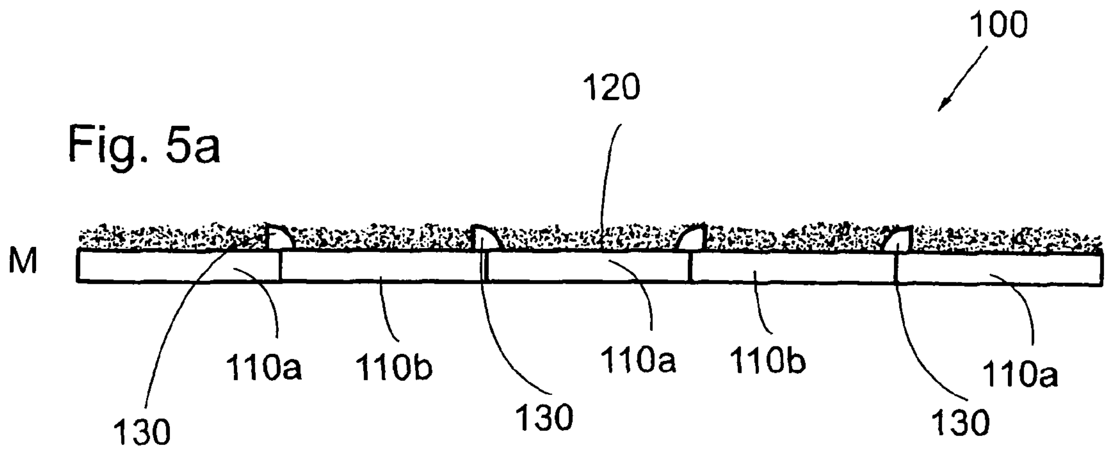
FIGS. 5*a*-5*c* show different scenarios of the directing means according to the invention is a cross-section along line A in FIG. 1.
Figure 5B:
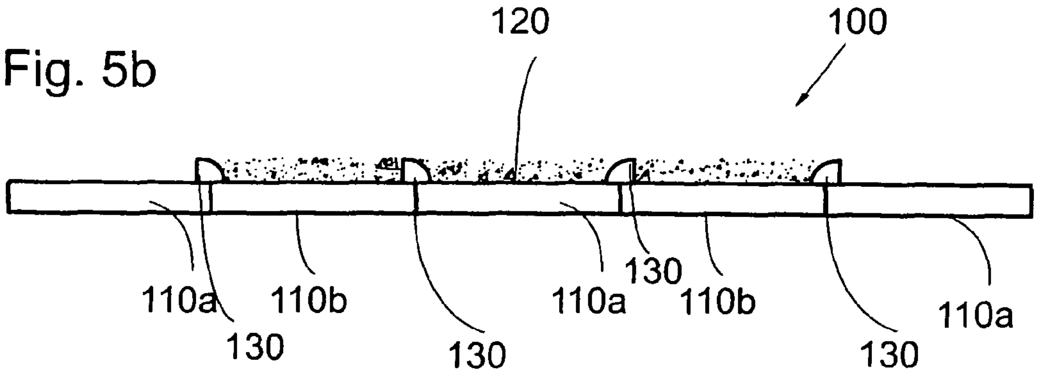
Figure 5C:
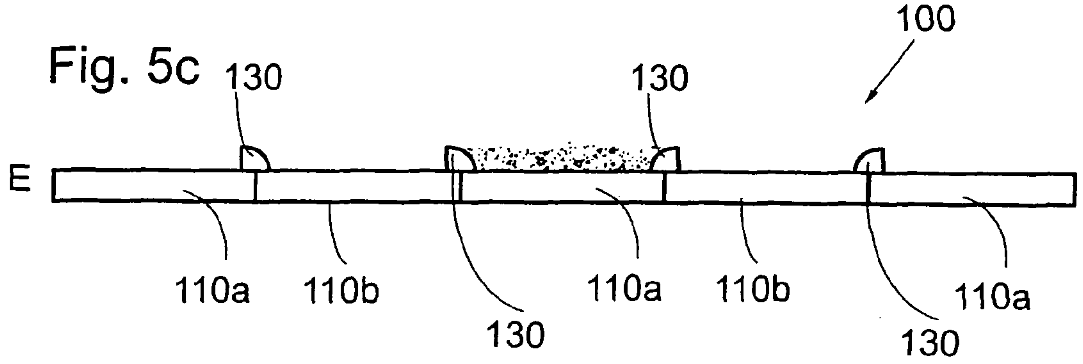
Figure 6A:
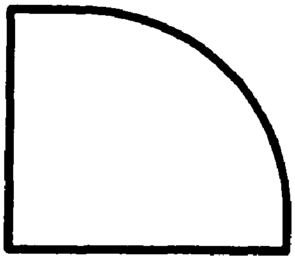
FIGS. 6*a-g* are cross sections of alternative configurations of the directing means on the screening arrangement according to the invention.
Figure 6B:
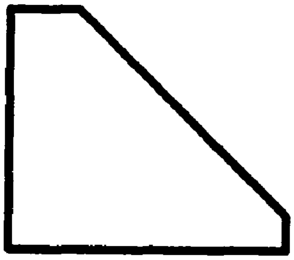
Figure 6C:
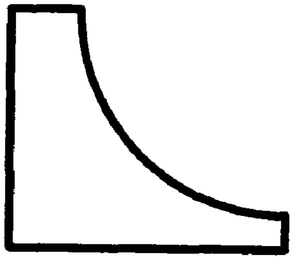
Figure 6D:
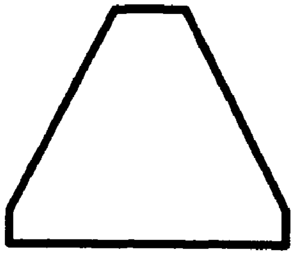
Figure 6E:
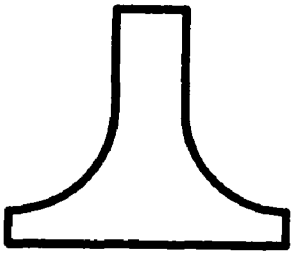
Figure 6F:
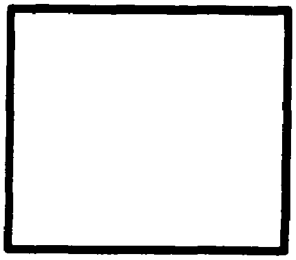
Figure 6G:
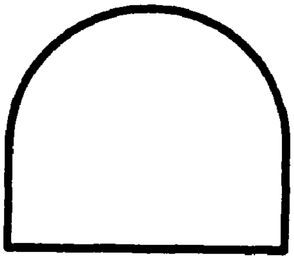

The function of the raised portions 130, 230 is seen in FIGS. 5_a_-5_c_, where a cross section of the screening arrangement 100, with a material flow at three different positions on the screening deck 120, is shown. At a first position shown in FIG. 5_a_, substantially defined as being in the middle part M of the screening arrangement 100 (see FIGS. 1 and 2), there is a high material flow, and raised portions 130 earlier on the screening deck have dispersed the material over the entire width of the screening arrangement 100. At a second position shown in FIG. 5_b_, further down on the screening deck 120, there is a medium material flow, and the material has been gathered by the raised portions 130 to be distributed over a part of the width of the screening deck 120. At a third position shown in FIG. 5_c_, substantially defined as being in the end part E of the screening arrangement 100 (see FIGS. 1 and 2), there is a low material flow, and the material has been gathered by the raised portions 130 to be distributed/gathered to only a small part of the width of the screening deck 120. At all positions the raised portions 130 serve to enable a flexible and adaptive effective screening width of the screening arrangement 100 as the raised portions create an even and optimal material layer at all positions of the screening arrangement 100. Depending on the volume of the material flow, the raised portions 130, 230 can be arranged differently.

The screening arrangement 100 of FIG. 1 includes two screening decks 120. There can naturally be further screening decks 120 in such a screening arrangement 100 if needed, and all or several of the screening decks 120 may be provided with directing means 130, where the arrangement or positions as well as the configuration of the direction means 130 may vary between the screening decks 120. This is also the case for the screening arrangement 200 of FIG. 3.

In FIGS. 6_a_-6_g_, the cross section of different possible designs of the directing means or raised portions 130, 230 are shown. The shape or cross section of the raised portions 130, 230 will affect the function of the raised portions 130, 230 on the screening deck 120 or the screening media 210. The different variants shown in FIGS. 6_a_-6_g_ can be used in different positions of the screening deck 120, or a screening media 210 can be provided with only one type of raised portions 130, 230.

The cross section of the directing means 130, 230 can vary along the length of the directing means, e.g. the thickness of the directing means may vary from being relatively thin, at an upper position of the screening deck 120, to being relatively thick at the other end of the directing means, lower down on the screening deck 120. Such a variation of the cross section will contribute to the directing or gathering functionality of the directing means. Other variations of the cross section of the directing means are also possible.

In the shown embodiments, a certain length of the raised portions 130, 230 and angles $\alpha 1$ and $\alpha 2$ have been shown. However, the same dispersing or gathering effect of the raised portions can be created with shorter raised portions being inclined more by larger angles $\alpha 1$ and $\alpha 2$ relative to the longitudinal direction of the screening arrangement, or longer raised portions being inclined less by smaller angles $\alpha 1$ and $\alpha 2$ relative to the longitudinal direction of the screening arrangement.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A screening arrangement in a vibrating screen that screens a layer of stone or gravel material as the material travels in a direction of a longitudinal axis of the screening arrangement, the screening arrangement comprising:

directing means provided on top of the screening arrangement that direct the material, all of the directing means being oriented to direct the material away from the longitudinal axis in a first region of the screening arrangement, and all of the directing means being oriented to direct material toward the longitudinal axis in a second region of the screening arrangement, wherein the directing means adjust the width of material in relation to the amount of material to achieve a continuous optimal layer of the material, by first directing the material laterally away from the longitudinal axis in the first region such that the layer of material becomes thinner, and then as the amount of material is reduced by traveling in the direction of the longitudinal axis and being screened, directing the material laterally towards the longitudinal axis in the second region such that the layer of material becomes thicker, wherein the screening arrangement includes a screening media in the form of a plurality of individual screening elements, the plurality of individual screening elements includes separate screening elements adjacent at least one screening element in both a longitudinal direction and a transverse direction, and wherein the directing means are formed as an integrated part of the screening elements, the directing means being raised portions on the surface of the screening elements and being arranged obliquely to the longitudinal axis.

2. The screening arrangement according to claim 1, wherein the directing means and the screening media are made of the same material.

3. The screening arrangement according to claim 1, wherein the directing means are made of a different material than the screening media.

4. The screening arrangement according to claim 1, wherein the directing means are made of a material having different friction characteristics than the material of the screening media.

5. The screening arrangement according to claim 1, wherein each screening element of the screening arrangement is provided with directing means.

6. The screening arrangement according to claim 1, wherein the directing means are made of one of polymer materials, ceramics, steel and any combination thereof.

7. The screening arrangement according to claim 1, wherein directing means of different shape can be located at different locations of the screening arrangement.

8. The screening arrangement according to claim 1, wherein the individual screening elements include longitudinal sides that are oblique to the longitudinal direction.

9. The screening arrangement according to claim 1, wherein the individual screening elements include a narrow end and a wide end on opposing longitudinal ends of the screening element.

10. The screening arrangement according to claim 9, wherein the individual screening elements are arranged alternately at least in the transverse direction with a screening element having a narrow end on the opposite longitudinal end of the screening element from the narrow end of the transversely adjacent screening element.

11. The screening arrangement according to claim 1, wherein the directing means are integrated to a longitudinal side of at least one of the individual screening elements.

12. The screening arrangement according to claim 1, wherein the directing means have the same length as the screening element to which it is integrated.

* * * * *